United States Patent [19]
Chen

[11] Patent Number: 5,787,305
[45] Date of Patent: Jul. 28, 1998

[54] HOST SIGNAL PROCESSING MODEM USING A SOFTWARE SIMULATION OF A UART

[75] Inventor: Peter C. Chen, Saratoga, Calif.

[73] Assignee: PC-Tel, Inc., Milpitas, Calif.

[21] Appl. No.: 428,935

[22] Filed: Apr. 25, 1995

[51] Int. Cl.[6] .............................. G06F 3/00; G06F 13/00
[52] U.S. Cl. .................. 395/823; 395/500; 395/681; 395/507
[58] Field of Search ..................... 395/500, 700, 395/829, 838, 839, 823, 284, 281, 282, 412, 421.07, 681, 507; 375/220, 222; 711/202, 217

[56] References Cited

U.S. PATENT DOCUMENTS

| | | | |
|---|---|---|---|
| 4,373,181 | 2/1983 | Chisholm et al. | 395/421.01 |
| 4,730,251 | 3/1988 | Aakre et al. | 395/284 |
| 4,773,005 | 9/1988 | Sullivan | 395/829 |
| 4,875,186 | 10/1989 | Blume | 364/900 |
| 5,038,365 | 8/1991 | Belloc et al. | 395/829 |
| 5,170,470 | 12/1992 | Pindar et al. | 375/222 |
| 5,301,276 | 4/1994 | Kimura | 395/829 |
| 5,408,614 | 4/1995 | Thornton et al. | 395/841 |
| 5,428,748 | 6/1995 | Davidson et al. | 395/829 |
| 5,450,530 | 9/1995 | Snyder et al. | 375/220 |
| 5,604,870 | 2/1997 | Moss et al. | 395/280 |
| 5,640,594 | 6/1997 | Gibson et al. | 395/829 |

FOREIGN PATENT DOCUMENTS

| | | |
|---|---|---|
| 0 173 905 | 3/1986 | European Pat. Off. . |
| 0 221 303 | 5/1987 | European Pat. Off. . |

OTHER PUBLICATIONS

Langston: "Fast Serial Data Comms on a PC port", Electronic Product Design, May 1992, Manchester, UK, pp. 31–35, XP000578604.

*Microsoft Windows Device Driver Adaptation Guide*, (1994) pp. 271–273.

1994 National Semiconductor Telecommunication Data Book, 1994, pp. 4–19 to 4–35.

*Primary Examiner*—Dung C. Dinh
*Attorney, Agent, or Firm*—Skjerven,Morrill,MacPherson, Franklin & Friel LLP; David T. Millers

[57] ABSTRACT

A computer system includes a software UART emulation and uses standard operating system protocols to minimized the chance of I/O conflicts between a serial device having a UART and a non-standard serial device which communicates through the UART emulation. A COM driver which can replace a standard COM driver in an operating environment such as provided by Microsoft WINDOWS™ contains the UART emulation. The COM driver can also include a software modem that is accessed through the UART emulation in the same manner as a modem having a hardware UART. The COM driver also sets the device address of the non-standard device on an ISA bus by determining the device addresses of COM port I/O slots used by UARTs, sending a predetermined pattern on the ISA bus to indicate a device address is to come, and then sending a value indicating a device address not used by the UARTs. The pattern has a length sufficient to make inadvertent generation of the pattern unlikely. The non-standard device recognizes the predetermined pattern and selects a device address according to the value from the COM driver.

2 Claims, 7 Drawing Sheets

Microfiche Appendix Included
(1 Microfiche, 15 Pages)

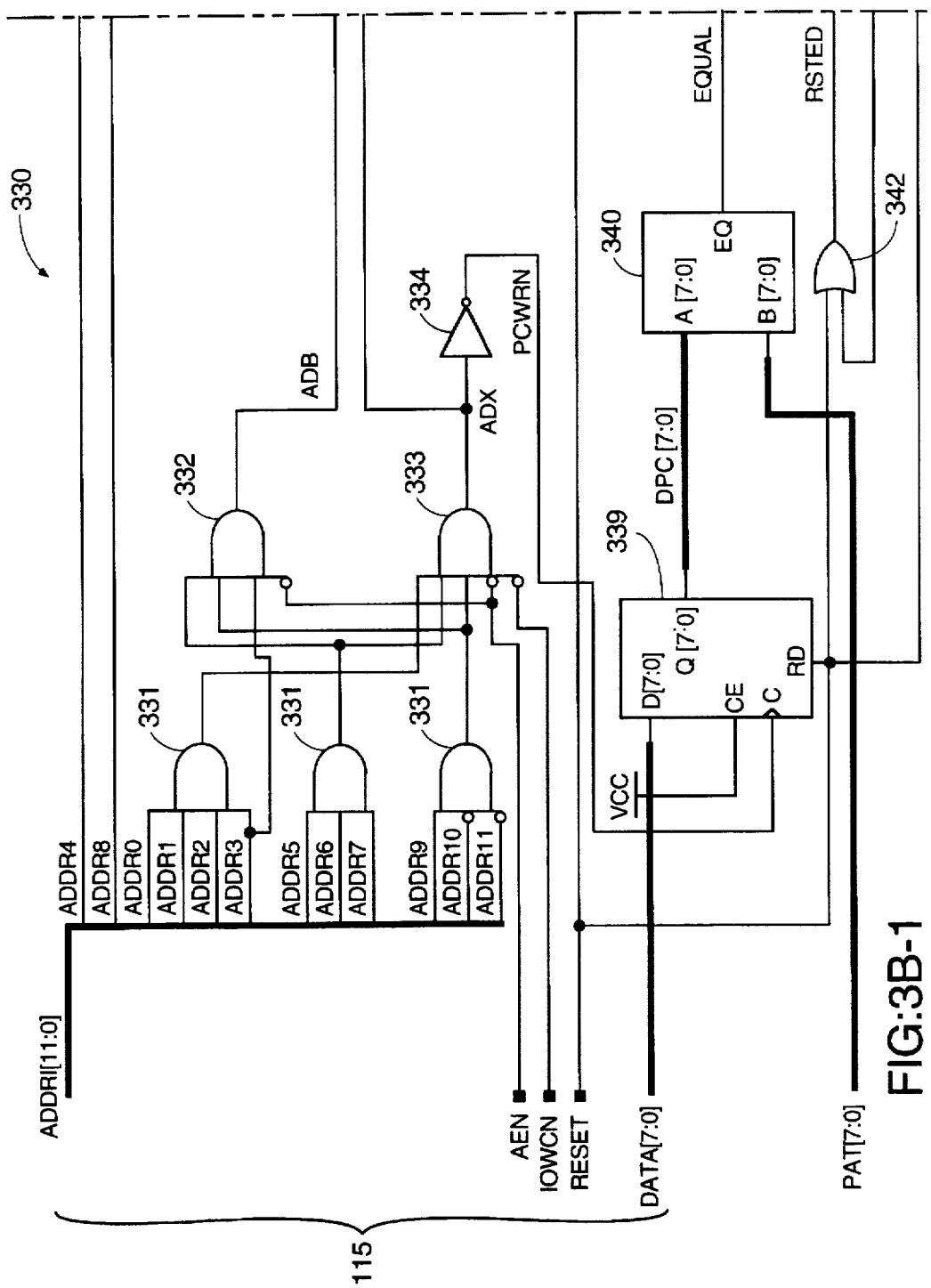
FIG:3B-1

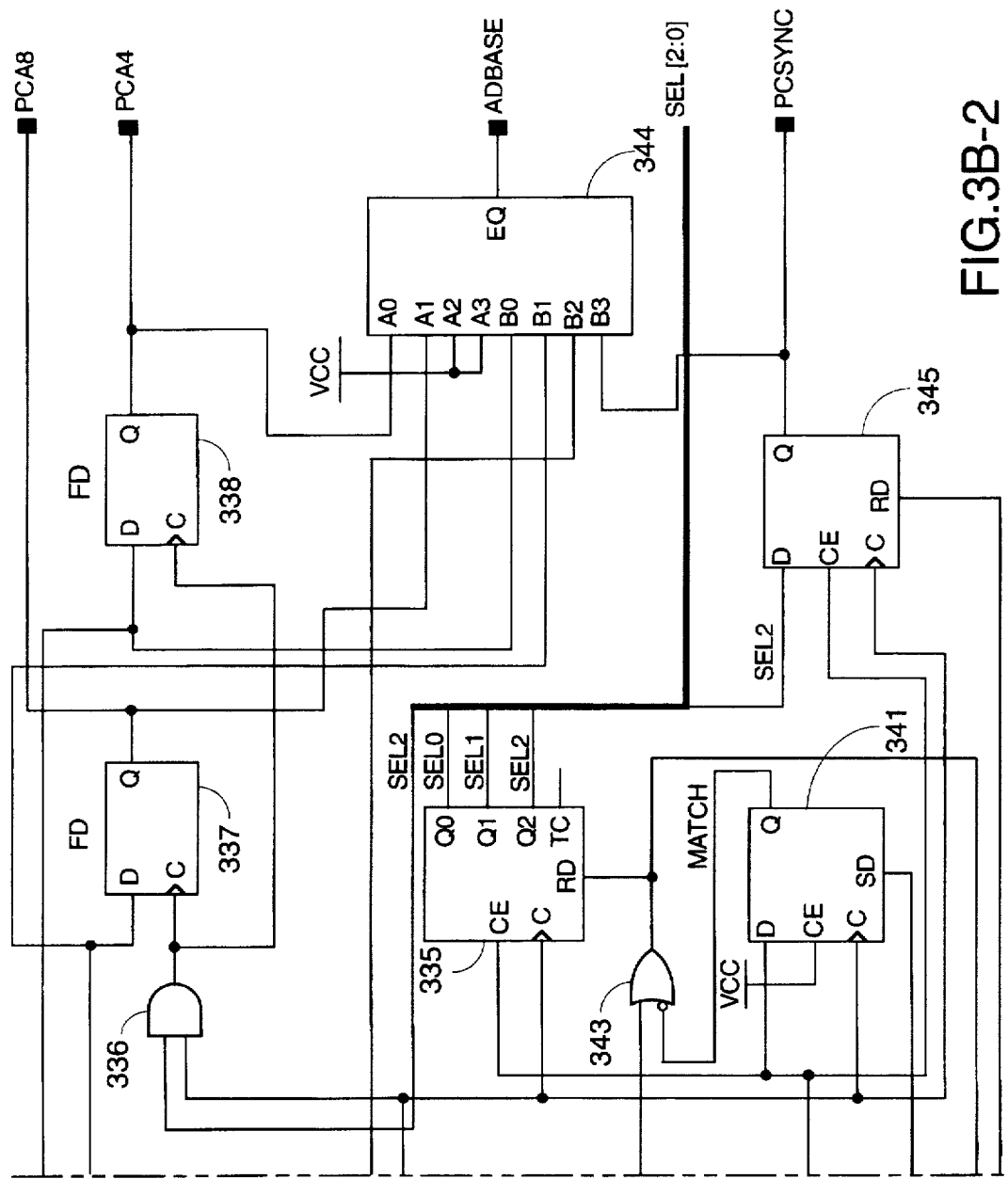

1

HOST SIGNAL PROCESSING MODEM USING A SOFTWARE SIMULATION OF A UART

REFERENCE TO MICROFICHE APPENDIX

The present specification comprises a microfiche appendix A. The total number of microfiche sheets in the microfiche appendix is one. The total number of frames in the microfiche appendix is fifteen.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

This invention relates to a computer system including a device having a non-standard I/O interface coupled to a local bus and a software emulation of a universal asynchronous receiver transmitter (UART), and further relates to processes and circuit for avoiding conflicts when assigning a COM port to a non-standard device.

2. Description of Related Art

A typical personal computer (PC) has one or more local buses such as ISA, VESA, and/or PCI buses for connection of user-selected devices. The PC communicates with the devices using device addresses typically indicated by the settings of jumper wires or toggle switches on the device. Problems can arise because there is no guaranty that a set of devices, made by different manufacturers, can operate together without address conflicts. Even if a set of devices can operated together, connection of the devices to a local bus may require that the user identify address conflicts and change address settings to avoid the conflicts. This can make adding devices to a PC difficult.

Common devices connected to an ISA bus include serial input/output (I/O) devices such as a printer, a modem, or a mouse. Some operating environments such as Microsoft WINDOWS™ running in conjunction with MS-DOS operating system provide for standardized connections to serial devices coupled to the ISA bus. In particular, WINDOWS™ and MS-DOS support four communication or COM ports, each having a predefined base device address. This allows resolution of device address conflicts if each serial device coupled to the ISA bus has settings for at least four different base device addresses. Each COM port is for connection to a serial device which contains a communication interface known as a Universal Asynchronous Receiver/Transceiver (UART). The UART is well known in the art and described, for example, in the 1994 "Telecommunication Data Book" from National Semiconductor Corporation, which is incorporated by reference herein in its entirety.

FIG. 1 illustrates conventional communications between a serial device 110 and an application 140 via an operating environment 130 and a communications driver 120. Operating environment 130 provides a library of subroutines which application 140 calls to communicate with serial device 110. The subroutines call communications driver 120 which writes and reads data and control information to and from a UART 105. The standardized communication interface illustrated in FIG. 1 reduces the complexity of application 140 because application 140 is not required to implement a variety of communication protocols. Accordingly, most application's are written for the standard interface. However, a standard hardware UART may be unsuitable or too expensive for some devices. Accordingly, techniques are needed which provide non-standard devices with the benefits of a standard UART interface.

SUMMARY OF THE INVENTION

In accordance with the invention, a software emulation of a UART (universal asynchronous receiver transmitter) allows a device with a non-standard I/O interface to communicate with an application through an operating environment which contains procedures for accessing standard UART interfaces. The software UART allows a non-standard device to take advantage of protocols which avoid device address conflicts among COM ports. Further, differences between the non-standard device and a standard UART device are transparent to the applications running under the operating environment.

In one embodiment of the invention, a computer system includes a non-standard device and a COM driver for the non-standard device. The non-standard device connects to an I/O slot corresponding to a first COM port but has a register set which differs from the standard register set for a UART. The COM driver contains: a UART emulation which in response a procedure requesting access to a register of a UART at the first COM port, instead accesses storage locations in main memory of the computer system; and an I/O handler which transfers values between the storage locations in main memory and the register set of the device. Optionally, the system includes a standard device having a UART coupled to an I/O slot corresponding to a second COM port, and the COM driver contains routines for accessing the standard device.

To avoid address conflicts with standard devices, the non-standard device has a circuit for setting the device address of the non-standard device. In one embodiment, this circuit contains a comparator adapted for receiving a data signal from the local bus and for comparing the data signal to a pattern signal which has a predetermined series of values; a counter coupled to the comparator, wherein the counter resets to an initial state if the comparator indicates the data signal is not equal to the pattern signal and advances toward a final state if the comparator indicates the data signal equals the pattern signal; and a register which, in response to the counter reaching the final state, latches from the local bus a value which indicates the base address of the non-standard device. Typically, the circuit also contains an address decoder that selects which data signals the comparator receives from the local bus.

The COM driver sets the base address of the non-standard device by sending a predetermined pattern of address and data signals on the local bus and then following the pattern with a signal that indicates the base address of the device. The device starts in a locked state where the device does not have a base address and does not respond to signals on the local bus. Once the device recognizes the pattern sent by the COM driver, the device address is set to the value provided by the COM driver, and the device transitions to an unlocked state. In the unlocked state, the device responds to signals on the local bus which correspond to the base address of the device.

BRIEF DESCRIPTION OF THE DRAWINGS

FIG. 3B is a block diagram of an embodiment of a base address decoder usable in the circuit of FIG. 3A.

Use of the same reference symbols in different figures indicates similar or identical items.

DETAILED DESCRIPTION OF THE PREFERRED EMBODIMENTS

Figure 1:
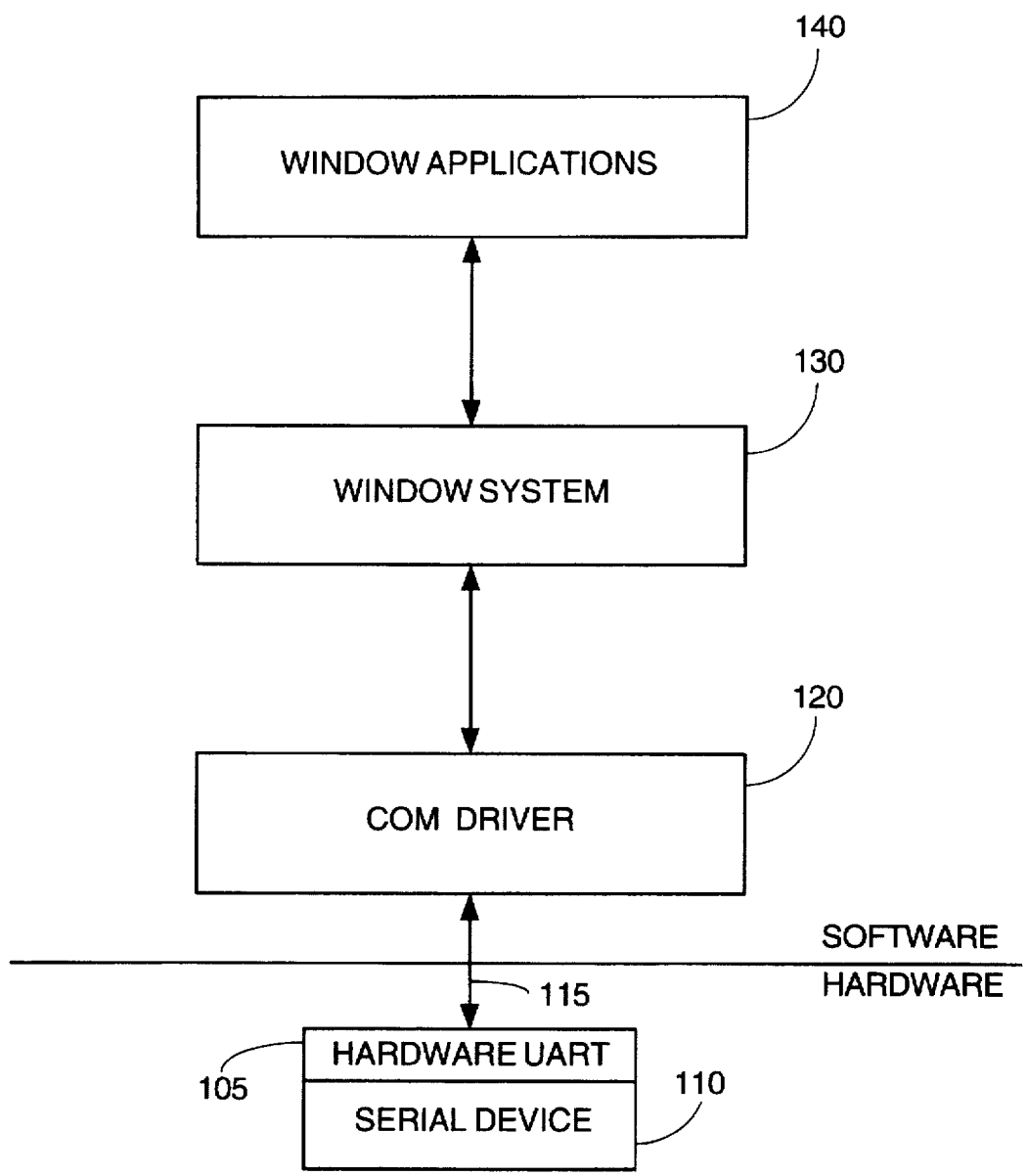
FIG. 1 shows a block diagram of a prior art interface between an application and a UART device.
Figure 2:
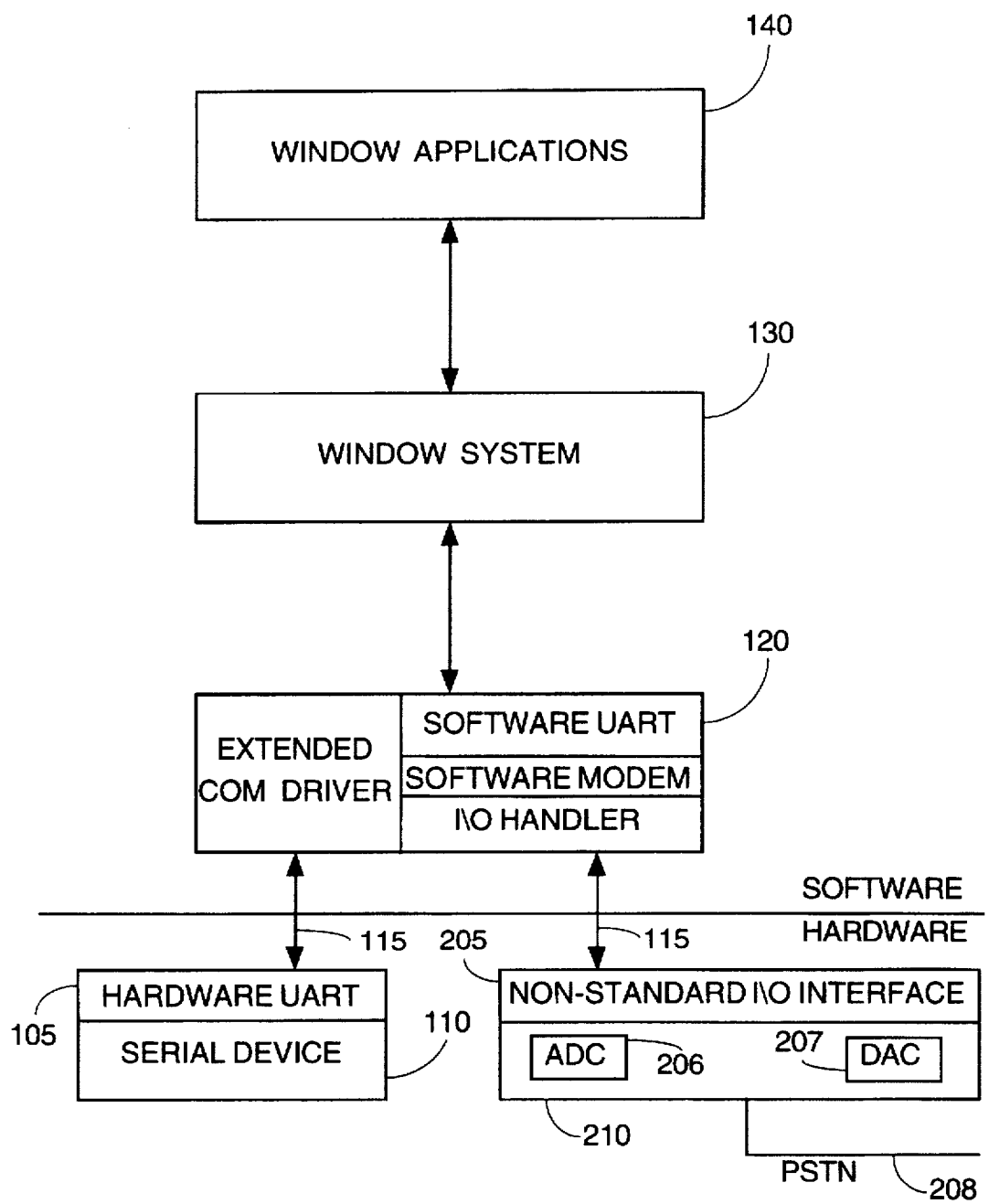
FIG. 2 shows a block diagram of an interface in accordance with an embodiment of the invention.

An embodiment of this invention illustrated in FIG. 2 allows an application 140 running in an operating environment 130 to communicate with a serial device 110 having a hardware UART 105 and/or a serial device 210 having non-standard input/output (I/O) interface 205. A COM driver 220 contains conventional software subroutines for communications with hardware UART 105 and a software UART 222 for serial device 210. Software UART 222 allows operating environment 130 and application 140 to transparently communicate with non-standard serial device 210 as if serial device 210 contained a hardware UART.

In one embodiment of the invention operating environment 130 includes Microsoft WINDOWS™ which supports four COM ports for communications with up to four serial devices connected to an ISA bus 115. A standard COM port occupies a slot of eight addresses on ISA bus 115. The eight addresses correspond to registers of a standard UART, which function as shown in Table 1.

TABLE 1

| Offset | Register |
|---|---|
| 0 | Rx/Tx Buffer (read/write) or Divisor Latch least significant byte. |
| 1 | Interrupt Enable or Divisor Latch most significant byte. |
| 2 | Interrupt Identification |
| 3 | Line control |
| 4 | Modem control |
| 5 | Line status |
| 6 | Modem status |
| 7 | Scratch |

The divisor latch indicated in Table 1 is enabled by setting a bit DLAB in the line control register.

Serial device 210 logically occupies a COM port but does not have a hardware UART which physically occupies an I/O address slot on ISA bus 115. Accordingly, the I/O slot for the COM port used by serial device 210 is available for non-standard interface 205. Non-standard I/O 205 occupies up to eight addresses on ISA bus 115 but need not comply with the standard functions given in Table 1. An example non-standard interface is disclosed below.

Application 140 can be any sort of software. A typical application 140 is a communication program that transmits and receives data through a modem. To access a device connected to ISA bus 115, application 140 calls a routine in operating environment 130. The routine calls COM driver 220, and COM driver 220 accesses devices 110 and/or 210 via ISA bus 115. COM driver 220 is software containing a standard COM driver for UART 105 and a software UART 222 and an I/O handler 224 for communications with non-standard I/O device 210. A computer running application 140 executes software of COM driver 220 when operating environment 130 calls COM driver 120 and during interrupts.

Microfiche A contains a listing of 8086 assembly language program which implements software UART 222 and I/O handler 224. Software UART 222 contains a set of virtual registers which are memory locations in the computer running COM driver 220 and which correspond to the registers of a standard UART. The virtual registers are updated using information from serial device 210 and operating environment 130. I/O handler 224 accesses serial device 210 (hardware) which is referred to as the ASIC in Appendix A.

During initialization of COM ports, COM driver 220 determines which of the four COM ports are allocated to standard UART devices, determines if a non-standard device is present, and then allocates an unassigned COM port and I/O slot to device 210. Serial device 210 is initially locked during start-up. When locked, serial device 210 receives a data signal DATA and address signal ADDR from ISA bus 115, but does not responds to any address. COM driver 220 unlocks device 210 by transmitting address signal ADDR and data signal DATA with values equal to predefined pattern recognized by device 210. When unlocked, the base device address of device 210 depends on information that COM driver 220 provided while unlocking device 210. Device 210 replies to the address set by COM driver 220 to indicate that device 210 is present.

Figure 3A:
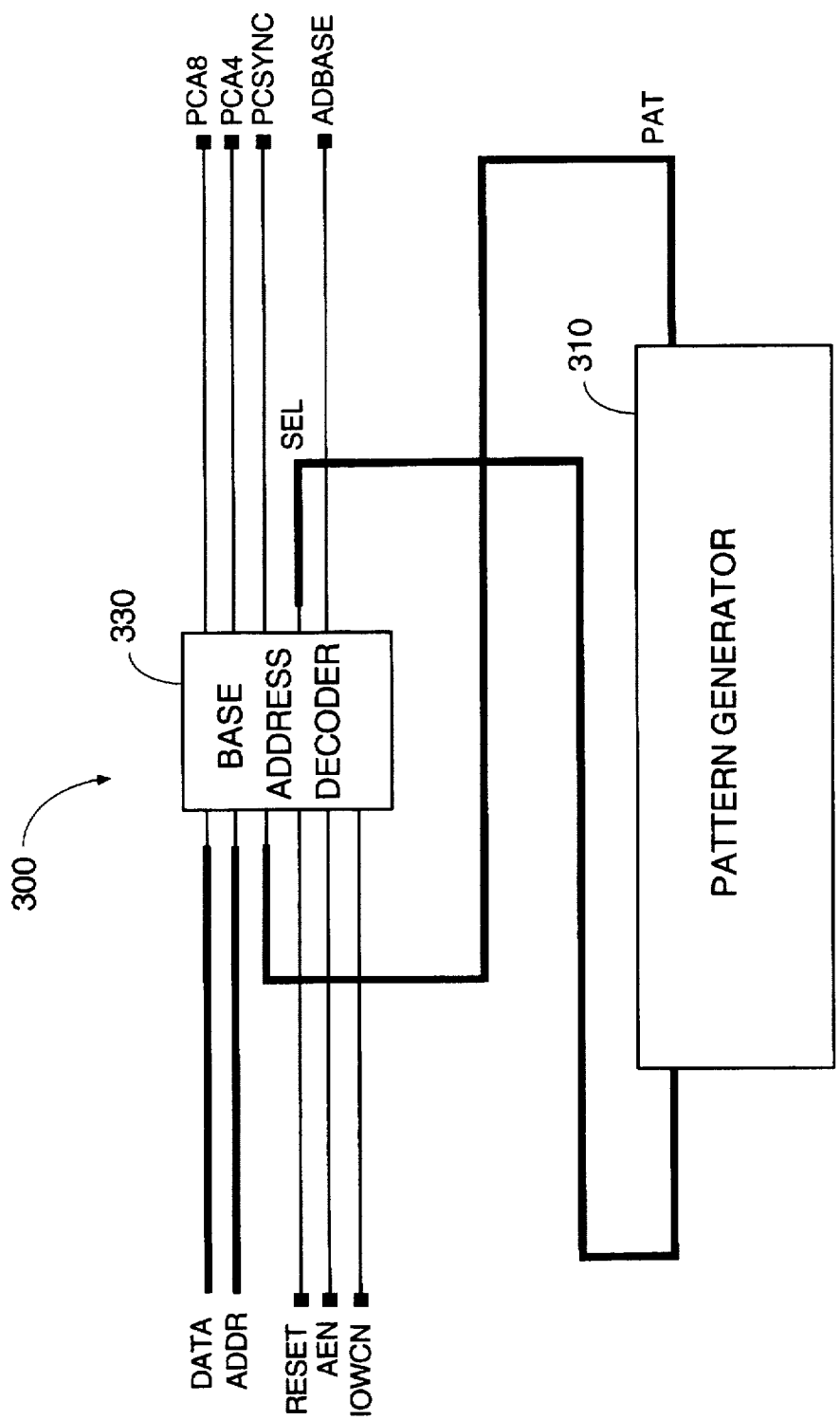
FIG. 3A is a block diagram of a circuit which unlocks a device and sets the base device address of the device.

FIG. 3A shows a block diagram of an unlocking circuit 300 which unlocks a device coupled to a local bus of a computer. Although, unlocking circuit 300 is described herein in the context of a serial device coupled to an ISA bus, unlocking circuit 300 is more generally applicable to any device coupled to a local bus such as a VLB or PCI bus.

Unlocking circuit 300 contains a base address decoder 330 and a pattern generator 310. While the device is locked, base address decoder 330 asserts a signal SEL to pattern generator 310. Pattern generator 310 generates a signal PAT that represents a byte which is from a predefined sequence and corresponds to the value of signal SEL. Signal SEL starts in an initial state, such as indicating a count value of zero or a maximum count. Each time the local bus carries an address signal ADDR having a recognized value, base address decoder 330 compares data signal DATA from the local bus to signal PAT and if signals PAT and DATA are equal, changes signal SEL so that signal SEL advances toward a final state. Otherwise, signal SEL is reset to indicate to the initial state. Advancing signal SEL can for example increment a count value from an initial state (minimum value) toward a final state (maximum value) or decrement the count from an initial state (maximum value) to a final state (minimum value).

When signal SEL reaches the final state, base address decoder 330 receives and stores a base address for the device and then asserts a signal PCSYNC to indicate the device is unlocked. The COM driver can transmit the base address to the device in a number of ways. For example, the address signal used during transmission of the pattern or a following data signal can indicate the base address.

FIG. 3B shows a block diagram of an embodiment of base address decoder 330. Base address decoder 330 contains AND gates 331, 332, and 333 which are coupled address lines of ISA bus 115. AND gate 333 asserts a signal ADX when signal IOWCN indicates the computer is writing data and address signal ADDR[11:0] has the form 001x 111x 1111 binary where x indicates that bits ADDR4 and ADDR8 are "don't care" bits, i.e. can have either value 0 or 1. The COM driver selects values for bits ADDR8 and ADDR4 so that signal ADDR[11:0] does not correspond to any other device coupled to the ISA bus. A signal AEN indicates when a DMA controller in the computer places an address on ISA bus 115. In the embodiment shown, unlocking circuit 300 does not respond to the DMA controller, and signal ADX is only asserted if signal AEN indicates address signal ADDR [11:0] is not from the DMA controller.

AND gate 333 deasserts signal ADX when at the end of a write cycle and causes register 339 to latch a byte from signal DATA[7:0] on ISA bus 115. A comparator 340 compares the latched byte to signal PAT[7:0] and asserts a signal EQUAL if the latched byte equals the byte indicated by signal PAT[7:0]. Signal EQUAL determines what occurs the next time signal ADX is asserted. Signal EQUAL acts as a clock enable signal for a counter 335 and a flip-flop 345 and acts as an input signal for flip-flop 341. With signal EQUAL asserted when AND gate 333 asserts signal ADX, counter 335 increments count signal SEL[2:0], flip-flop 341 asserts a signal MATCH, and flip-flop 345 sets signal PCSYNC to the value of bit SEL2 of signal SEL[2:0]. With signal EQUAL deasserted when AND gate 333 asserts signal ADX, flip-flop 341 deasserts signal MATCH which resets counter 335 to an initial state with count value zero. Thus, counter 335 is reset to zero each time a data byte from ISA bus 115 is not equal to the data byte from the predefined pattern. Additionally, a signal RESET from ISA bus 115 can reset counter 335.

Count signal SEL[2:0] increments if signal EQUAL is asserted when COM driver 220 generates on ISA bus 115 an address of the form 001x 111x 1111 and a data byte equal to signal PAT[7:0]. Incrementing signal SEL[2:0] causes pattern generator 310 to set signal PAT[7:0] to indicate the next byte in the predefined pattern.

Figures 1, 3C:
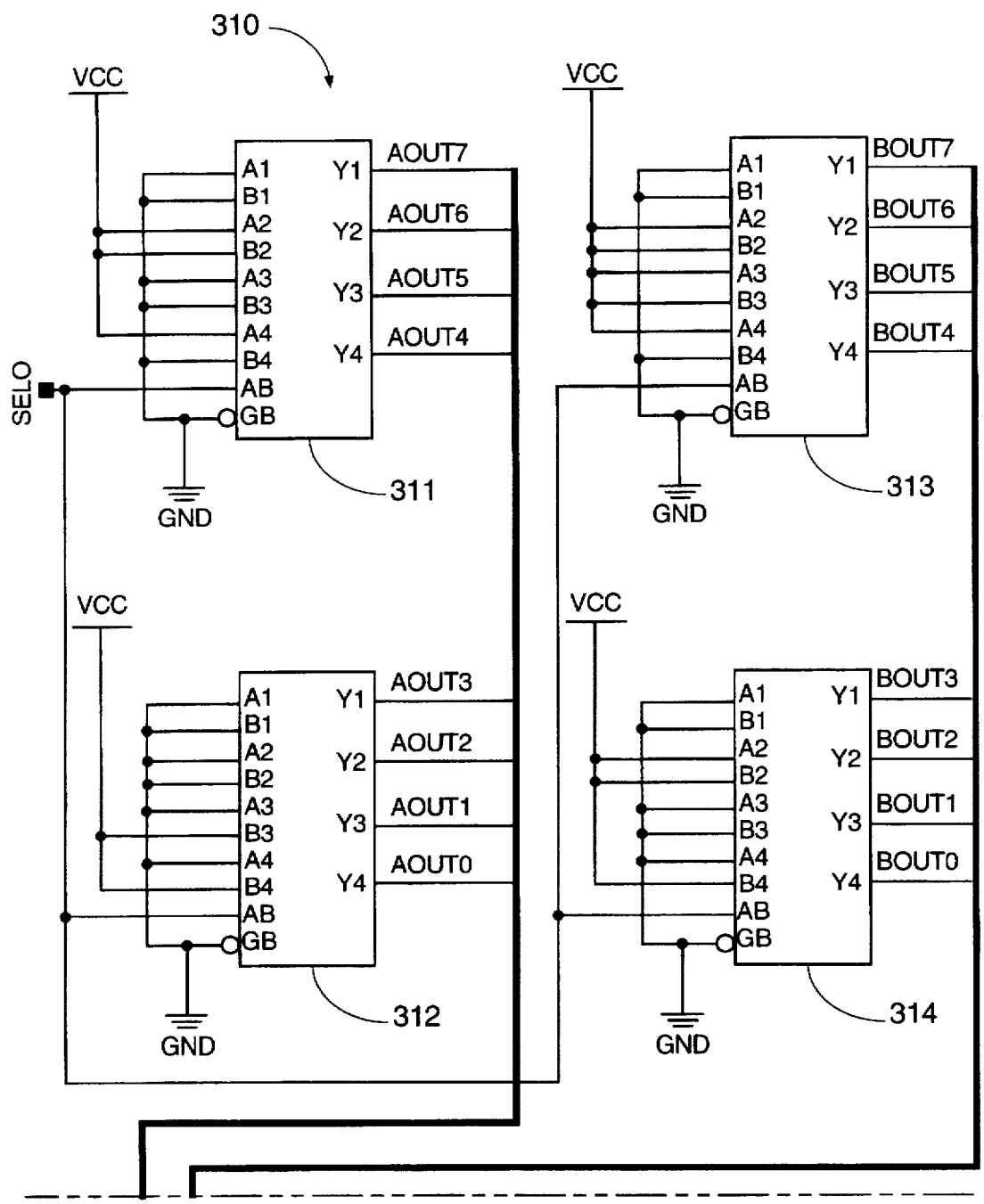
FIG. 3C is a block diagram of an embodiment of a pattern generator usable in the circuit of FIG. 3A.
Figures 2, 3C:
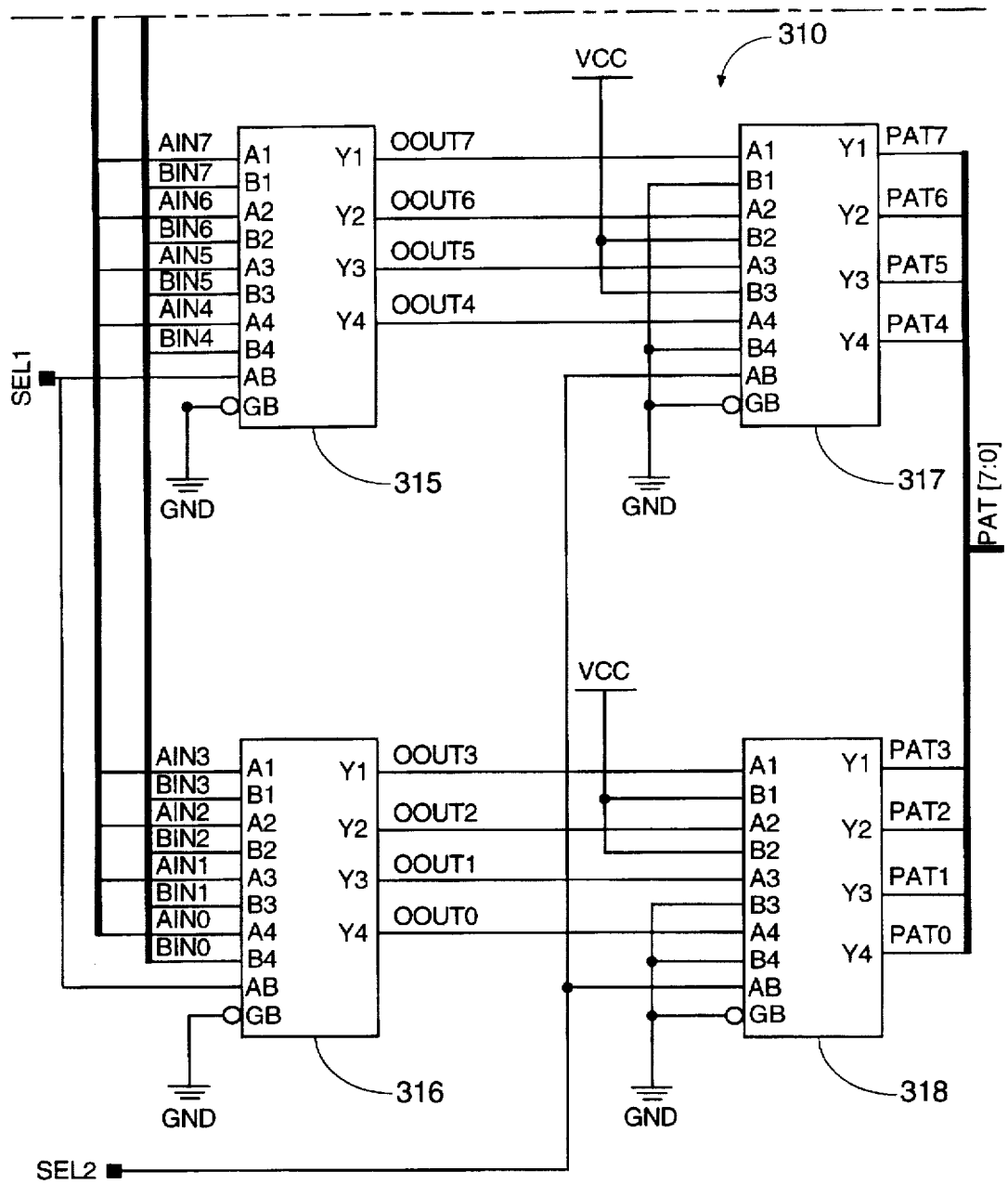

FIG. 3C is a block diagram of an embodiment of pattern generator 310. Pattern generator 310 contains multiplexers 311 to 318 which have select terminals coupled to receive signal SEL[2:0]. Input terminals of multiplexers 311 to 314 are coupled to voltage VCC or ground. Signal SEL0 selects one of the two values for a signal AOUT[7:0] from multiplexers 311 and 312 and one of two values for a signal BOUT[7:0] from multiplexers 313 and 314. Multiplexers 315 and 316 select an output signal DOUT[7:0] which is equal to either signal AOUT[7:0] or BOUT[7:0] depending on select signal SEL1. Multiplexers 317 and 318 select signal PAT[7:0] which is equal to signal DOUT[7:0] or a fixed value depending on the value of select signal SEL2. Pattern generator 310 generates a five byte string, the ASCII code for "PCtel", which indicates the manufacturer of the device.

Many alternative patterns and pattern generators may be used in place of the embodiment shown in FIG. 3C. For example, pattern generator 310 can be implemented using a memory such as a read-only memory where signal SEL[2:0] is an address signal or implemented using combinatorial logic where signal SEL[2:0] is an input signal. Each value in the pattern can be longer or shorter than a byte and can be a constant value independent of signal SEL. Further, the predetermined pattern can be longer or shorter that to five values. Increasing the length of the pattern reduces the chance of a device being unintentionally unlocked.

If COM driver 220 sends a sequence of five data bytes matching the predefined pattern, counter 335 increments to final state and bit SEL2 of signal SEL[2:0] is set when a fifth byte is sent. With bit SEL2 set, AND gate 333 asserting signal ADX causes flip-flops 337 and 338 to latch and store bits ADDR8 and ADDR4 of address signal ADDR[11:0] and causes flip-flop 345 to assert signal PCSYNC. Signal PCSYNC indicates that the device is unlocked and has a base address of the form 001a 111b 1000, where signals PCA8 and PCA4 from flip-flops 337 and 338 indicate the values of bits a and b. Values of bits a and b have four possible combinations which allows COM driver 220 to select a combination that provides a base address that differs from the base addresses of the three other COM ports.

Signals PCA4 and PCA8 are latched when an address signal ADDR[11:0] is asserted for a byte following the predefined pattern. The byte following the predefined pattern does not match signal PAT[7:0] from pattern generator 310. Accordingly, counter 335 is reset to the initial state, and bit SEL2 is cleared. Signals PCA8 and PCA4 do not change unless the predefined pattern is retransmitted. Unintentional transmission of the predefined pattern is unlikely during normal operation of the computer system, but if desired, COM driver 220 monitor the pattern being transmitted and prevent repetition of the predefined pattern, for example by writing a no-op value to device 210.

Once the device is unlocked, a signal ADBASE indicates whether address signal ADDR[11:0] corresponds to the device. An AND gate 332 asserts a signal ADB if address signal ADDR[11:0] has the form 001x 111x 1xxx when signal AEN indicates the address signal ADDR[11:0] is not from the DMA controller. A comparator 344 asserts signal ADBASE only if signal ADB is asserted, signal PCSYNC is asserted, and bits ADDR8 and ADDR4 of address signal ADDR[11:0] equal signals PCA8 and PCA4. Conventional address decoding circuits (not shown) decode bits ADDR2, ADDR1, and ADDR0 to determine which register in the device is being accessed via ISA bus 115.

The additional decoding circuits and the register set of the device can be implemented as required for the function of the device. The standard UART interface need not be followed. This allows an I/O interface to be optimized and implemented for the particular function of the device.

FIG. 2 shows an embodiment where serial device 210 contains an analog-to-digital converter (ADC) 206 and a digital-to-analog converter (DAC) 207 which are connected to PSTN phonelines 208 for implementation of a software modem. In this embodiment, software UART 222 and I/O handler 224 are part of a software modem 223. A register set in non-standard I/O interface 205 is described in Table 2.

TABLE 2

| Offset | Register |
| --- | --- |
| 0 | Data Register (Low Byte) |
| 1 | Data Register (High Byte) |
| 2 | Control/Status Register (Low Byte) |
| 3 | Control/Status Register (High Byte) |
| 4 | Input/Output Port Register |
| 5 | Reserved |
| 6 | Reserved |
| 7 | Pattern Port Register |

In the register set of Table 2, the data registers are for 16-bit data words sent to DAC 207 or received from ADC 206 by the host computer. Input/output port register are for modem functions such as ring detection and control of an on-off hook relay (to connect or disconnect device 208 to an active phone line) which are implemented by hardware in serial device 210. The control/status registers contain general purpose control and status bits for serial device 210.

ADC 206 receives an analog communications signal from phonelines 208 and converts the analog communications signal into a series of sampled digital values. Software modem 223 receives the sampled digital values and based on the waveform represented by the sampled values and on the modem protocol employed determines data received. Software modem 223 also generates a series of digital values which are sent to DAC 207 and transmitted as an analog signal on phonelines 208. The transmitted analog signal provides a carrier signal and data values formatted according to standard modem protocols such as ITU V.32bis, V.32, V.22bis, V.23, V.22, V.21, V.17, V.29, and V.27ter standards. Device 210 generates periodic interrupts during which software modem 223 reads a set of sampled digital values from ADC 206 and writes a set of digital values which represent the transmitted analog signal. COM driver 220 sets the interrupt number (or IRQ) used by device 210 to a user selected one of eight values.

Application 140 communicates with software modem 223 in the same manner as with a conventional hardware modem. Application 140 sends and receives data and control values via operating environment 130. The data and control values are formatted for a standard UART device so that whether software modem 223 is a standard modem containing a hardware UART or a software modem is completely transparent to application 140 and operating environment 130.

Although the present invention has been described with reference to particular embodiments, the description is only an example of the invention's application and should not be taken as a limitation. Various adaptations and combinations of features of the embodiments disclosed will be apparent to those skilled in the art and are within the scope of the present invention as defined by the following claims.

I claim:
1. A system comprising:
   a computer having a processing unit, a main memory, and a local bus;
   a device coupled to the local bus, wherein the device occupies an I/O slot that corresponds to a first communications port on the local bus, and the device has a register set with an address assignment in the first communication port that differs from a standard address assignment of a register set for a UART corresponding to the first communication port;
   an operating system executed by the processing unit, wherein the operating system includes a procedure for accessing a register set of a UART corresponding to the first communications port; and
   a communications driver executed by the processing unit, the communication driver comprising:
      a UART emulation which in response to an access by the procedure for accessing the register set of a UART, converts the access as required for the register set and address assignment of the device; and
      a software modem adapted to convert digital samples from the device to data values transmitted to the UART emulation and adapted to convert data values from the UART emulation to digital samples for the device.

2. The system of claim 1, wherein the software modem performs conversions in accordance with a communication protocol for a communication signal.

* * * * *

(12) EX PARTE REEXAMINATION CERTIFICATE (5052nd)
United States Patent
Chen

(10) Number: US 5,787,305 C1
(45) Certificate Issued: Jan. 11, 2005

(54) HOST SIGNAL PROCESSING MODEM USING A SOFTWARE SIMULATION OF A UART

(75) Inventor: Peter C. Chen, Saratoga, CA (US)

(73) Assignee: PCTEL, Inc., San Jose, CA (US)

Reexamination Request:
No. 90/006,058, Jul. 10, 2001

Reexamination Certificate for:
Patent No.: 5,787,305
Issued: Jul. 28, 1998
Appl. No.: 08/428,935
Filed: Apr. 25, 1995

(51) Int. Cl.[7] .......................... G06F 3/00; G06F 13/00; G06F 9/455; G06F 17/00
(52) U.S. Cl. .......................... 715/540; 703/24; 703/27; 719/321; 710/5; 710/16; 710/62; 710/64; 710/65; 710/69; 375/222
(58) Field of Search .......................... 710/1, 3, 5, 8, 710/9, 15, 16, 20, 62, 64, 65, 69, 70, 71, 100, 101, 102, 104; 375/220, 222; 715/540; 703/24, 27; 719/321

(56) References Cited

U.S. PATENT DOCUMENTS

| | | |
|---|---|---|
| 4,373,181 A | 2/1983 | Chisholm et al. |
| 4,730,251 A | 3/1988 | Aakre et al. |
| 4,773,005 A | 9/1988 | Sullivan |
| 4,817,147 A | 3/1989 | Gorniak et al. |
| 4,875,186 A | 10/1989 | Blume, Jr. |
| 4,949,333 A | 8/1990 | Gulick et al. |
| 4,965,641 A | 10/1990 | Blackwell et al. |
| 5,038,365 A | 8/1991 | Belloc et al. |
| 5,170,470 A | 12/1992 | Pindar et al. |
| 5,301,276 A | 4/1994 | Kimura |
| 5,408,614 A | 4/1995 | Thornton et al. |
| 5,428,748 A | 6/1995 | Davidson et al. |
| 5,450,530 A | 9/1995 | Snyder et al. |
| 5,477,415 A | 12/1995 | Mitcham et al. |
| 5,541,955 A * | 7/1996 | Jacobsmeyer ............... 375/222 |
| 5,557,634 A | 9/1996 | Balasubramanian et al. |
| 5,604,870 A | 2/1997 | Moss et al. |
| 5,628,030 A | 5/1997 | Tuckner |
| 5,640,594 A | 6/1997 | Gibson et al. |
| 5,644,593 A | 7/1997 | Bailey et al. |
| 5,646,983 A | 7/1997 | Suffern et al. |
| 5,654,983 A | 8/1997 | Sauser, Jr. |
| 5,678,059 A | 10/1997 | Ramaswamy et al. |
| 5,724,413 A | 3/1998 | Suffern et al. |
| 5,812,820 A | 9/1998 | Loram |
| 5,872,836 A | 2/1999 | Suffern et al. |
| 6,012,113 A | 1/2000 | Tuckner |
| 6,097,794 A | 8/2000 | Suffern et al. |
| 6,144,464 A * | 11/2000 | Rupp et al. ................. 358/442 |
| 6,185,628 B1 * | 2/2001 | Sands et al. .................... 710/5 |
| 6,446,232 B1 | 9/2002 | Chan et al. ................. 714/746 |

FOREIGN PATENT DOCUMENTS

| | | |
|---|---|---|
| EP | 0 173 905 | 3/1986 |
| EP | 0 221 303 | 5/1987 |

OTHER PUBLICATIONS

Andrew S. Tanenbaum, Structured Computer Organization, 1984 by Prentice Hall, Second Edition, pp. 10–12.*

(List continued on next page.)

Primary Examiner—Jeffrey Gaffin

(57) ABSTRACT

A computer system includes a software UART emulation and uses standard operating system protocols to minimized the chance of I/O conflicts between a serial device having a UART and a non-standard serial device which communicates through the UART emulation. A COM driver which can replace a standard COM driver in an operating environment such as provided by Microsoft WINDOWS™ contains the UART emulation. The COM driver can also include a software modem that is accessed through the UART emulation in the same manner as a modem having a hardware UART. The COM driver also sets the device address of the non-standard device on an ISA bus by determining the device addresses of COM port I/O slots used by UARTs, sending a predetermined pattern on the ISA bus to indicate a device address is to come, and then sending a value indicating a device address not used by the UARTs. The pattern has a length sufficient to make inadvertent generation of the pattern unlikely. The non-standard device recognizes the predetermined pattern and selects a device address according to the value from the COM driver.

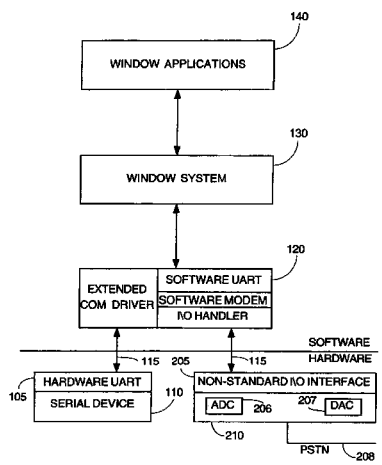

OTHER PUBLICATIONS

TurboCom/95 Pro—High-Speed Serial Communications for Windows 95 published by Pacific CommWare, Inc., 1991–96.

Specification entitled "VCD.ASM—Virtual COM Device", Version 3.10, Apr. 10, 1989 by RAP.

Specification entitled "VCD.inc—" Version 1.00 dated May 3, 1989 by RAP.

Specification entitled "combuff.asm—" Version 1.00 dated Jan. 30, 1990 by RAL.

Rosenberg, J.M., "Dictionary of Computers, Information Processing & Telecommunications", 1987, p. 189 and p. 434.

Langston, D., "Fast Serial Data Comms On A PC Port", Electronic Product Design, 1992, Manchester, UK, pp. 31–35, XP000578604.

*Microsoft Windows Device Driver Adaptation Guide*, 1994, pp. 271–273.

"Communications Architecture", in *Visual Studio 6.0 Documentation*, Web address: http://msdn.microsoft.com/library/winresource/dnwin95/s71d3.htm.

"National Semiconductor NS16450, INS8250A, NS16C450, INS82C50A Universal Asynchronous Receiver/Transmitter", 1994 National Semiconductor Telecommunications Guide, 1994, pp. 4–19 to 4–35.

Art of Electronics $1^{st}$ Edition, Definition of UART.

Art of Electronics $2^{nd}$ Edition, p. 803 and p. 984.

ESS2838 Data Sheet.

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 2 is confirmed.

* * * * *